June 26, 1934.  J. H. GRIFFIN  1,964,320
APPARATUS FOR POLISHING GLASS PLATES OR STRIPS
Filed April 7, 1934

Inventor.
James Harris Griffin
By Morrison, Kennedy & Campbell
Attorneys.

Patented June 26, 1934

1,964,320

UNITED STATES PATENT OFFICE 1,964,320

APPARATUS FOR POLISHING GLASS PLATES OR STRIPS

James Harris Griffin, near St. Helens, England, assignor to Pilkington Brothers Limited, Liverpool, England, a British company Application April 7, 1934, Serial No. 719,446
In Great Britain April 13, 1933

4 Claims. (Cl. 51—263)

This invention relates to glass polishing apparatus of the type in which horizontal glass plates or strips are polished simultaneously on their upper and lower sides, and has for its object a device for supplying rouge or the like for the polishing.

The invention is applicable to polishing apparatus in which the polishing tools rotate and, in their rotation, project beyond the width of the strip or series of plates of glass.

According to the invention, the rouge feeding apparatus for the lower polishing tools comprises a rouge distributor rotating with the upper polishing tools, feeding pipes therefrom terminating above the glass and extending beyond its width during a part of their revolution, and means for interrupting the flow of rouge therefrom when they are over the glass. Preferably the flow interrupting means is a rubber tube attached to the lower end of each rouge feeding pipe terminating just below the level of the upper surface of the glass, so that its end is closed by the glass. Preferably also rouge for the upper polishing tools is fed from a rouge distributor independent of that for the lower tools also rotating with the upper tools.

The polishing medium commonly used for polishing glass is a mixture of rouge and water, and, in the following specification and claims the word "rouge" will be used to denote this mixture or any other polishing medium in liquid form.

In the accompanying drawing:—

Figure 1:
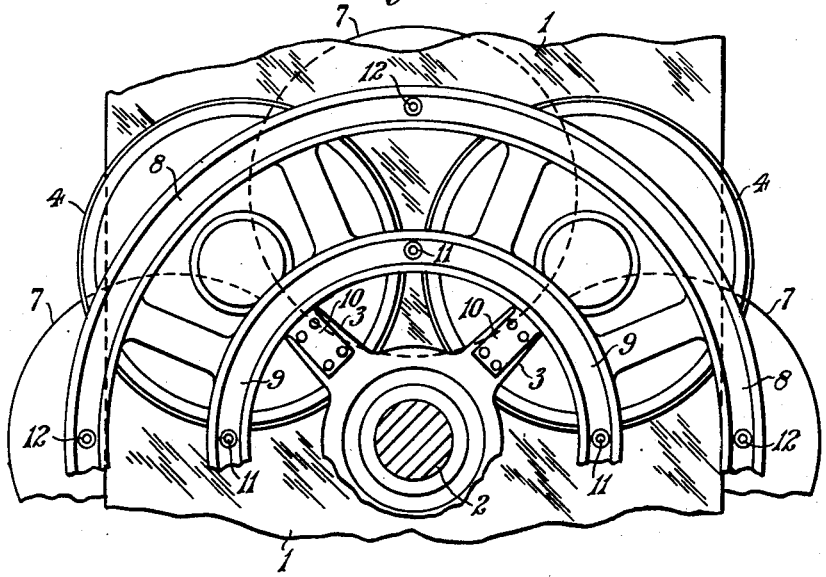
Figure 3:
Figure 2:
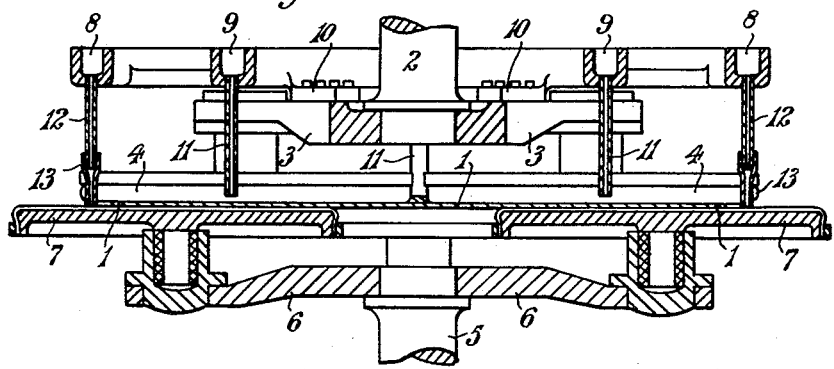

Figure 1 is a part plan of a polishing apparatus; Figure 2 is a central vertical section thereof; and Figure 3 is a sectional view, on an enlarged scale, of the lower end of a feeding pipe with interrupting device.

Referring to the drawing, 1 is a glass strip, 2 is the shaft of an upper polishing runner carrying four arms 3, at the ends of which are rotatably mounted circular polishing pads 4. Similar parts of a lower polishing runner are denoted by 5, 6 and 7 respectively, their polishing pads 7 being shown in dotted lines in Figure 1 where under the glass. The polishing pads project beyond the width of the glass 1 to the extent shown in the case of the lower polishing runners.

A pair of circular troughs 8, 9 serving as rouge distributors, are attached at 10 to the arms 3 of the upper polishing runner, the outer trough 8 having a diameter greater than the width of the glass 1. Pipes 11, from the bottom of the trough 9, descend between the polishing pads 4, and serve to feed rouge for the upper polishing pads to the upper surface of the glass 1. Pipes 12 descending from the bottom of the trough 8, have rubber tubes 13 attached to their lower ends, which terminate just below the upper surface of the glass 1. As shown in the drawing, the pipes 12 at the right and left extend beyond the width of the glass and are over the lower polishing pads 7. They then serve to feed rouge to these pads. When, as the upper polishing runner rotates, these pipes 12 come over the glass, their rubber tubes 13 are bent as shown in Figure 3, and the glass closes their openings, so as to interrupt the supply of rouge.

If the upper and lower polishing runners are geared together, the pipes 12 may be so disposed that, whenever they move beyond the width of the glass, they discharge rouge on to the surface of a polishing pad of the lower runner. If the two runners are not geared together, then the pipes 12 will at times discharge rouge into the space between two polishing pads. Account must be taken of the rouge so lost in determining the quantity fed into the trough 8.

It is not essential that the rouge be supplied to the upper and lower polishing tools from independent troughs, since the quantities supplied may be controlled by the sizes of the feeding pipes, but the arrangement shown, with independent troughs, has the advantage that measured quantities may be supplied to the two troughs.

The opening of the feed pipes 12 to discharge rouge, when beyond the width of the glass, may be effected by stationary cam surfaces operating on valves in the pipes, but the automatic interruption of the supply by the rubber tube 13 coming into contact with the glass has considerable advantage in simplicity and in avoiding any restriction in the bore of the feed pipes which might become obstructed by the rouge.

Having described my invention, I declare that what I claim and desire to secure by Letters Patent is:—

1. In apparatus for polishing simultaneously the upper and lower surfaces of a horizontal glass strip or series of plates, the combination with upper and lower rotating polishing tools projecting beyond the width of the strip or plates and rouge feeding apparatus for the upper polishing tools, of rouge feeding apparatus for the lower polishing tools comprising a rouge distributor rotating with the upper polishing tools, feeding pipes from said distributor terminating above the glass and extending beyond its width during a part of the revolution of the tools, and means ...iterrupt the flow of rouge from said
...s when they are over the glass.
...aratus for polishing simultaneously
... d lower surfaces of a horizontal glass
...ies of plates, the combination with
lower rotating polishing tools project-
l the width of the strip or plates and
'ng apparatus for the upper polishing
ige feeding apparatus for the lower
ools comprising a rouge distributor
th the upper polishing tools, feeding
said distributor terminating above the
xtending beyond its width during a
revolution of the tools, and a rubber
hed to the lower end of each of said
ing pipes and terminating just below
the glass so that its end is closed by
vhen the feeding pipe is over the glass.
pparatus for polishing simultaneously
and lower surfaces of a horizontal
or series of plates, the combination
and lower rotating polishing tools
jeyond the width of the strip or plates,
eeding apparatus for the upper polish-
ncluding a rouge distributor rotating
ools, of rouge feeding apparatus for
the lower polishing tools comprising an independent rouge distributor rotating with the upper polishing tools, feeding pipes from said distributor terminating above the glass and extending beyond its width during a part of the revolution of the tools, and means adapted to interrupt the flow of rouge from said feeding pipes when they are over the glass.

4. In apparatus for polishing simultaneously the upper and lower surfaces of a horizontal glass strip or series of plates, the combination with upper and lower rotating polishing tools projecting beyond the width of the strip or plates, and rouge feeding apparatus for the upper polishing tools including a rouge distributor rotating with said tools, of rouge feeding apparatus for the lower polishing tools comprising an independent rouge distributor rotating with the upper polishing tools, feeding pipes from said distributor terminating above the glass and extending beyond its width during a part of the revolution of the tools, and a rubber tube attached to the lower end of each of said rouge feeding pipes and terminating just below the level of the glass so that its end is closed by the glass when the feeding pipe is over the glass.

JAMES HARRIS GRIFFIN.